3,279,116
FISHING RODS
Bruce Chapman, 3795 A St., Lincoln, Nebr.
Filed Sept. 11, 1964, Ser. No. 395,954
1 Claim. (Cl. 43—23)

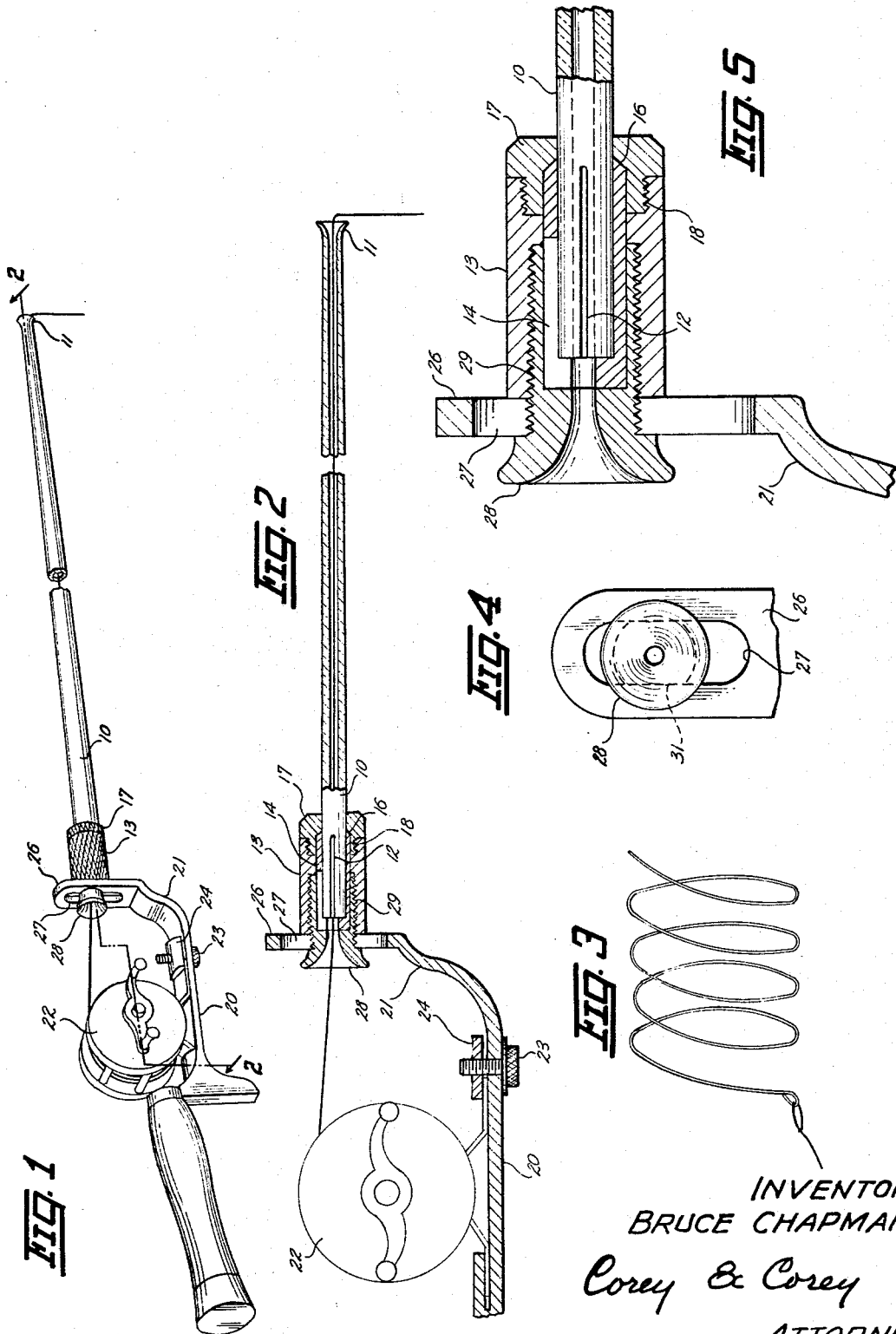

This invention relates to fishing rods and is directed to improvements in the type of rod in which the line leads from the reel out through an opening and extending through the rod from end to end.

In fishing rods of this type, the joint between the rod and handle creates troublesome difficulties, and feeding of the line into the hollow rod often results in snarling and entanglement of the line.

It is therefore among the objects of my invention to overcome the disadvantages above outlined and to provide a fishing rod and handle so constructed that the line leading from the reel may be perfectly aligned with the opening in the rod so that snarling and entanglement do not occur and the least amount of friction is encountered. This is of particular importance in the spinning type of reel lately coming into use, to secure as nearly perfect alignment as possible.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claim, without departing from the spirit of the invention.

In said drawings:

FIGURE 1 is a view in perspective of a rod and handle and reel constructed in accordance with one embodiment of my invention.

FIGURE 2 is a view in section of the rod and handle as shown in FIGURE 1.

FIGURE 3 is a view in perspective of the means for leading the line through the rod.

FIGURE 4 is a front elevational view of a portion of the forward part of the handle, and FIGURE 5 is a view, partly in side elevation and partly in section, of the knurled, cylindrical member which serves as a body both for the clamping means for clamping the rod in place and as a means for clamping the body to the forward portion of the handle.

Referring then to the drawings:

The hollow rod 10 is preferably formed of glass fiber laminated with suitable thermo-setting resin in accordance with the usual practice in constructing "Fiberglas" rods and may be in one or several sections. It is provided with a slightly belled tip as illustrated at 11, and is split as best illustrated at 12 in FIGURE 5, to provide means for rigidly clamping the rod in the body 13. This is accomplished by means of a cartridge-like pressure shell 14, tapered at its upper end as indicated at 16 so that the nut 17, when screwed tightly into the body 13 by means of the threads 18, causes the member 14 to press in against the slit portion of the rod and hold it tightly in place.

The handle 20, of usual construction, except for the forward portion illustrated at 21, is adapted to hold a reel 22 in place on the upper face of the handle, as illustrated in FIGURE 2, by means of any suitable clamping members such as the screw 23 and washer 24 or any other conventional clamping means.

The forward, upper part of the handle or body 20 is elongated upwardly, as illustrated at 26, to afford sufficient upward projection for a slot 27 for receiving the slightly bell-shaped entrance-way or guide 28 for the line entering the rod.

The bell-shaped member 28 acts as a sort of nut or collar threaded on the outside wall thereof, as illustrated at 29, for receiving the inside threads of the barrel 13. The member 28 is flattened somewhat at its neck portion 31 so as to prevent it from turning in the slot, and therefore rotation of the knurled body 13 will clamp the body 13 tightly on the nut and grip the slotted member 26 to hold a rod in any desired vertical position in the slot. One or both of the faces of the member 26 may be roughened to aid in the gripping action.

In use, the leader or line is threaded through the opening of the rod by means of a steel wire, illustrated in FIGURE 3. The rod is then aligned in the forward portion of the handle so that the line can enter the rod freely without friction when the rod is ready for use.

Although I have described a specific embodiment of my invention, it is apparent that modifications thereof may be made by those skilled in the art. Such modifications may be made without departing from the spirit and scope of my invention as set forth in the appended claim.

I claim as my invention:

In a fishing rod, a hollow rod, a handle having a vertically slotted forward portion, and clamping means for clamping the inner end of the rod in any desired position in the slotted member, the clamping means including a barrel engaged on the inner end of the rod, a guide passing through the slot and engaged to the barrel by threaded connection to enable clamping the barrel and the rod to the slotted forward portion of the handle in any desired position.

References Cited by the Examiner

UNITED STATES PATENTS

| 2,334,646 | 11/1943 | Price | 43—18 |
| 2,729,012 | 1/1956 | Lee | 43—18 |
| 2,961,209 | 11/1960 | Willey | 248—41 |

FOREIGN PATENTS

| 484,805 | 7/1952 | Canada. |

SAMUEL KOREN, *Primary Examiner.*

W. H. CAMP, *Assistant Examiner.*